United States Patent
Brown et al.

(10) Patent No.: US 6,587,822 B2
(45) Date of Patent: *Jul. 1, 2003

(54) WEB-BASED PLATFORM FOR INTERACTIVE VOICE RESPONSE (IVR)

(75) Inventors: Michael Kenneth Brown, North Plainfield, NJ (US); Kenneth G. Rehor, Berwyn, IL (US); Brian Carl Schmult, Doylestown, PA (US); Curtis Duane Tuckey, Chicago, IL (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/168,405

(22) Filed: Oct. 6, 1998

(65) Prior Publication Data

US 2001/0013001 A1 Aug. 9, 2001

(51) Int. Cl.⁷ ............................................... G10L 15/00
(52) U.S. Cl. ........................ 704/275; 704/251; 704/260
(58) Field of Search ........................ 379/88.17; 704/275, 704/260, 251, 246, 256, 258

(56) References Cited

U.S. PATENT DOCUMENTS

| | | | | | |
|---|---|---|---|---|---|
| 3,946,157 A | * | 3/1976 | Dreyfus | ...................... | 704/254 |
| 5,204,905 A | * | 4/1993 | Mitome | ...................... | 704/260 |
| 5,642,519 A | * | 6/1997 | Martin | ...................... | 704/9 |
| 5,774,628 A | * | 6/1998 | Hemphill | ...................... | 704/275 |
| 5,799,063 A | * | 8/1998 | Krane | ...................... | 379/88.17 |
| 5,802,526 A | * | 9/1998 | Fawcett et al. | ............. | 707/104 |
| 5,819,220 A | * | 10/1998 | Sarukkai et al. | ............. | 704/243 |
| 5,859,898 A | * | 1/1999 | Checco | .................... | 379/88.01 |
| 5,890,123 A | * | 3/1999 | Brown et al. | ............... | 704/275 |
| 5,915,001 A | * | 6/1999 | Uppaluru | ................. | 379/88.22 |
| 5,937,385 A | * | 8/1999 | Zadrozny et al. | ............ | 704/257 |
| 5,943,648 A | * | 8/1999 | Tel | .............................. | 704/260 |
| 5,945,989 A | * | 8/1999 | Freishtat et al. | ............. | 345/329 |
| 5,966,690 A | * | 10/1999 | Fujita et al. | ................. | 704/233 |
| 6,018,710 A | * | 1/2000 | Wynblatt et al. | ............ | 704/260 |
| 6,188,985 B1 | * | 2/2001 | Thrift et al. | ................. | 704/275 |

FOREIGN PATENT DOCUMENTS

WO     WO 98/35491     8/1998

OTHER PUBLICATIONS

D.L. Atkins et al., "Integrated Web and Telephone Service Creation," Bell Labs Technical Journal, pp. 19–35, Winter 1997.

J.C. Ramming, "PML: A Language Interface to Networked Voice Response Units," Workshop on Internet Programming Languages, ICCL '98, Loyola University, Chicago, Illinois, May 1998.

(List continued on next page.)

Primary Examiner—Daniel Abebe (57) ABSTRACT

A platform for implementing interactive voice response (IVR) applications over the Internet or other type of network includes a speech synthesizer, a grammar generator and a speech recognizer. The speech synthesizer generates speech which characterizes the structure and content of a web page retrieved over the network. The speech is delivered to a user via a telephone or other type of audio interface device. The grammar generator utilizes textual information parsed from the retrieved web page to produce a grammar. The grammar is supplied to the speech recognizer and used to interpret voice commands and other speech input generated by the user. The platform may also include a voice processor which determines which of a number of predefined models best characterized a given retrieved page, such that the process of generating an appropriate verbal description of the page is considerably simplified. The speech synthesizer, grammar generator, speech recognizer and other elements of the IVR platform may be operated by a Internet Service Provider (ISP), thereby allowing the general Internet population to create interactive voice response applications without acquiring their own IVR equipment.

29 Claims, 2 Drawing Sheets

OTHER PUBLICATIONS

M.K. Brown et al., "A Grammar Compiler for Connected Speech Recognition," IEEE Transactions on Signal Processing, vol. 39, No. 1, pp. 17–28, Jan. 1991.

M.K. Brown et al., "A Contex–Free Grammar Compiler for Speech Understanting Systems," in ICSLP '94, vol. 1, Yokohama, Japan, pp. 21–24, Sep. 1994.

E. Szurkowski et al., "An Interactive Consumer Video Services Platform Architecture," in Telecom '95 Technical Forum, Geneva, Switzerland, Oct. 1995.

"AudioWeb 1–732–WEB–2000," http://www.cs.rutgers.edu/Audio_Web/,pp. 1–4, Apr. 1998.

"VoxML Markup Language," http://www.oasis–open.org/cover/voxML.html, pp. 1–4, Jan. 2001.

"Now This is a Dial–Up," http://www.wired.com/news/technology/0,1282,15339,00.html, pp. 1–2, Sep. 1998.

M. Wynblatt et al., "Browsing the World Wide Web in a Non–Visual Environment," 4 pages, undated.

K. Kondo et al., "A WWW Browser Using Speech Recognition and Its Evaluation," Systems and Computers in Japan, vol. 29, No. 10, pp. 57–66, 1998.

E. Kaneen et al., "A Spoken Language Interface to Interactive Multimedia Services," IEEE Colloquium on Advances in Interactive Voice Technologies for Telecommunication Services, pp. 8/1–8/7, 1997.

\* cited by examiner

WEB-BASED PLATFORM FOR INTERACTIVE VOICE RESPONSE (IVR)

FIELD OF THE INVENTION

The present invention relates generally to the Internet and other computer networks, and more particularly to techniques for obtaining information over such networks via a telephone or other audio interface device.

BACKGROUND OF THE INVENTION

The continued growth of the Internet has made it a primary source of information on a wide variety of topics. Access to the Internet and other types of computer networks is typically accomplished via a computer equipped with a browser program. The browser program provides a graphical user interface which allows a user to request information from servers accessible over the network, and to view and otherwise process the information so obtained. Techniques for extending Internet access to users equipped with only a telephone or other similar audio interface device have been developed, and are described in, for example, D. L. Atkins et al., "Integrated Web and Telephone Service Creation," Bell Labs Technical Journal, pp. 19–35, Winter 1997, and J. C. Ramming, "PML: A Language Interface to Networked Voice Response Units," Workshop on Internet Programming Languages, ICCL '98, Loyola University, Chicago, Ill., May 1998, both of which are incorporated by reference herein.

Users developing Interactive Voice Response (IVR) applications to make use of the audio interface techniques described in the above references generally must utilize costly special-purpose IVR hardware, which can often be prohibitively expensive. The expense associated with this special-purpose JVR hardware prevents many users, such as small business owners and individuals, from building IVR applications for their web pages. Such users are therefore unable to configure their web pages so as to facilitate access by telephone or other audio interface device.

SUMMARY OF THE INVENTION

The present invention provides apparatus and methods for implementing Interactive Voice Response (IVR) applications over the Internet or other computer network. An illustrative embodiment of the invention is an IVR platform which includes a speech synthesizer, a grammar generator and a speech recognizer. The speech synthesizer generates speech which characterizes the structure and content of a web page retrieved over the network. The speech is delivered to a user via a telephone or other type of audio interface device. The grammar generator utilizes textual information parsed from the retrieved web page to produce a grammar. The grammar is then supplied to the speech recognizer and used to interpret voice commands generated by the user. The grammar may also be utilized by the speech synthesizer to create phonetic information, such that similar phonemes are used in both the speech recognizer and the speech synthesizer. In appropriate applications, such as name dialing directories and other applications having grammars with long compilation times, the grammar produced by the grammar generator may be partially or completely precompiled.

An IVR platform in accordance with the invention may also include other elements, such as, for example, a parser which identifies textual information in the retrieved web page and delivers the textual information to the grammar generator, and a voice processor which also receives web page information from the parser. The voice processor uses this information to determine which of a number of predefined models best characterizes a given retrieved web page. The models are selected to characterize various types and arrangements of structure in the web page, such as section headings, tables, frames, forms and the like, so as to simplify the generation of a corresponding verbal description.

In accordance with another aspect of the invention, the speech synthesizer, grammar generator and speech recognizer, as well as other elements of the IVR platform, may be used to implement a dialog system in which a dialog is conducted with the user in order to control the output of the web page information to the user. A given retrieved web page may include, for example, text to be read to the user by the speech synthesizer, a program script for executing operations on a host processor, and a hyperlink for each of a set of designated spoken responses which may be received from the user. The web page may also include one or more hyperlinks that are to be utilized when the speech recognizer rejects a given spoken user input as unrecognizable.

An IVR platform in accordance with the invention may be operated by an Internet Service Provider (ISP) or other type of service provider. By permitting dialog-based IVR applications to be built by programming web pages, the invention opens up a new class of Internet applications to the general Internet population. For example, Internet content developers are not required to own or directly operate an IVR platform if they have access to an IVR platform from an ISP. This is a drastic departure from conventional approaches to providing IVR service, which typically require the ownership of expensive IVR equipment. An ISP with an IVR platform system will be able to sell IVR support services to the general public at relatively low cost.

DETAILED DESCRIPTION OF THE INVENTION

The present invention will be illustrated below in conjunction with an exemplary system. It should be understood, however, that the invention is not limited to use with any particular type of system, network, network communication protocol or configuration. The term "web page" as used herein is intended to include a single web page, a set of web pages, a web site, and any other type or arrangement of information accessible over the World Wide Web, over other portions of the Internet, or over other types of communication networks. The term "platform" as used herein is intended to include any type of computer-based system or other type of system which includes hardware and/or software elements configured to provide one or more of the interactive voice response functions described herein.

1. System Description

Figure 1:
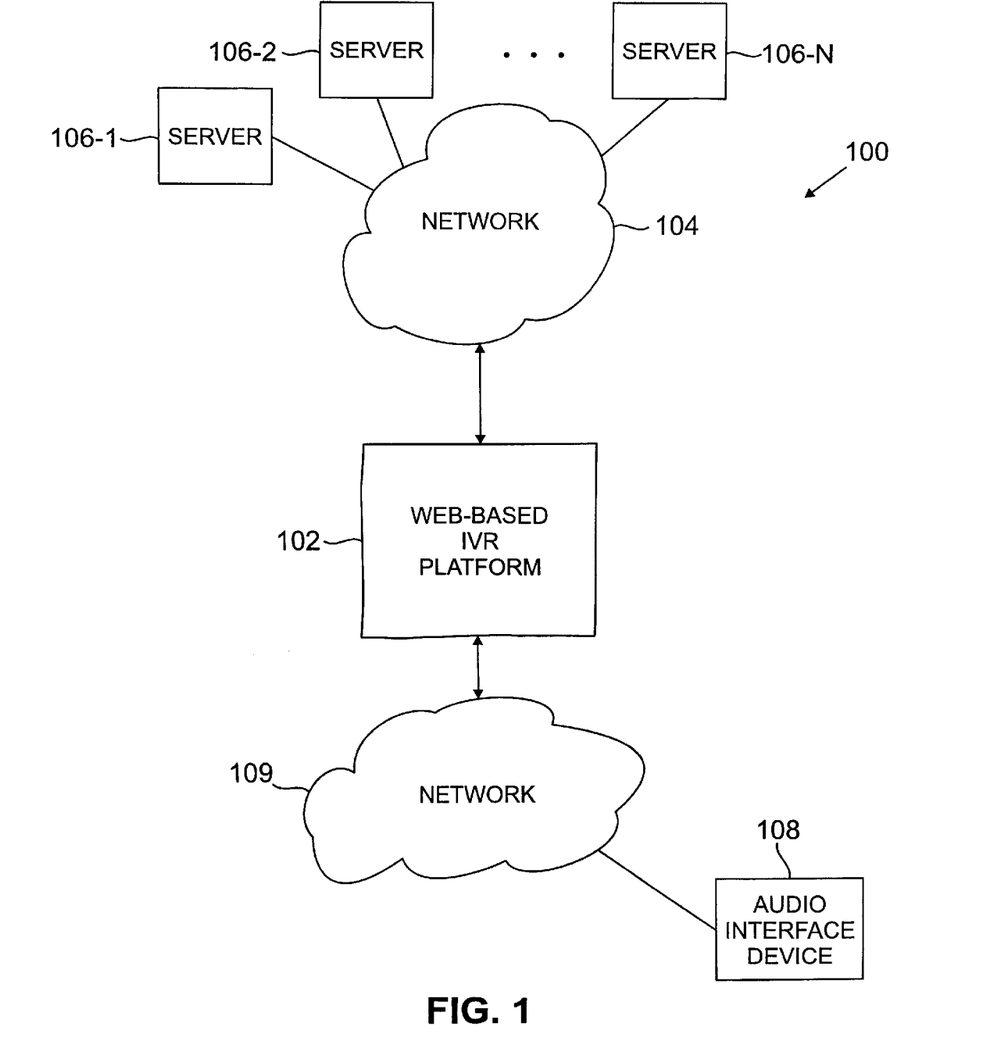
FIG. 1 is a block diagram of a system including a web-based interactive voice response (IVR) platform in accordance with the invention.

FIG. 1 shows an exemplary information retrieval system 100 in accordance with an illustrative embodiment of the invention. The system 100 includes a web-based IVR platform 102, a network 104, a number of servers 106-$i$, $i$=1, 2, ... N, and an audio interface device 108. The network 104 may represent the Internet, an intranet, a local area or wide area network, a cable network, satellite network, as well as combinations or portions of these and other networks. Communications between the IVR platform 102 and one or more of the servers 106-$i$ may be via connections established over the network 104 in a conventional manner using the Transmission Control Protocol/Internet Protocol (TCP/IP) standard or other suitable communication protocol (s). The servers 106-$i$ may each represent a computer or group of computers arranged in a conventional manner to process information requests received over network 104. The audio interface device 108 may be, for example, a telephone, a television set-top box, a computer equipped with telephony features, or any other device capable of receiving and/or transmitting audio information. The audio interface device 108 communicates with the IVR platform 102 via a network 109 which may be, for example, a public switched telephone network (PSTN), a cellular telephone network or other type of wireless network, a data network such as the Internet, or various combinations or portions of these or other networks. Although shown as separate networks in the illustrative embodiment of FIG. 1, the networks 104 and 109 may be the same network, or different portions of the same network, in alternative embodiments.

Figure 2:
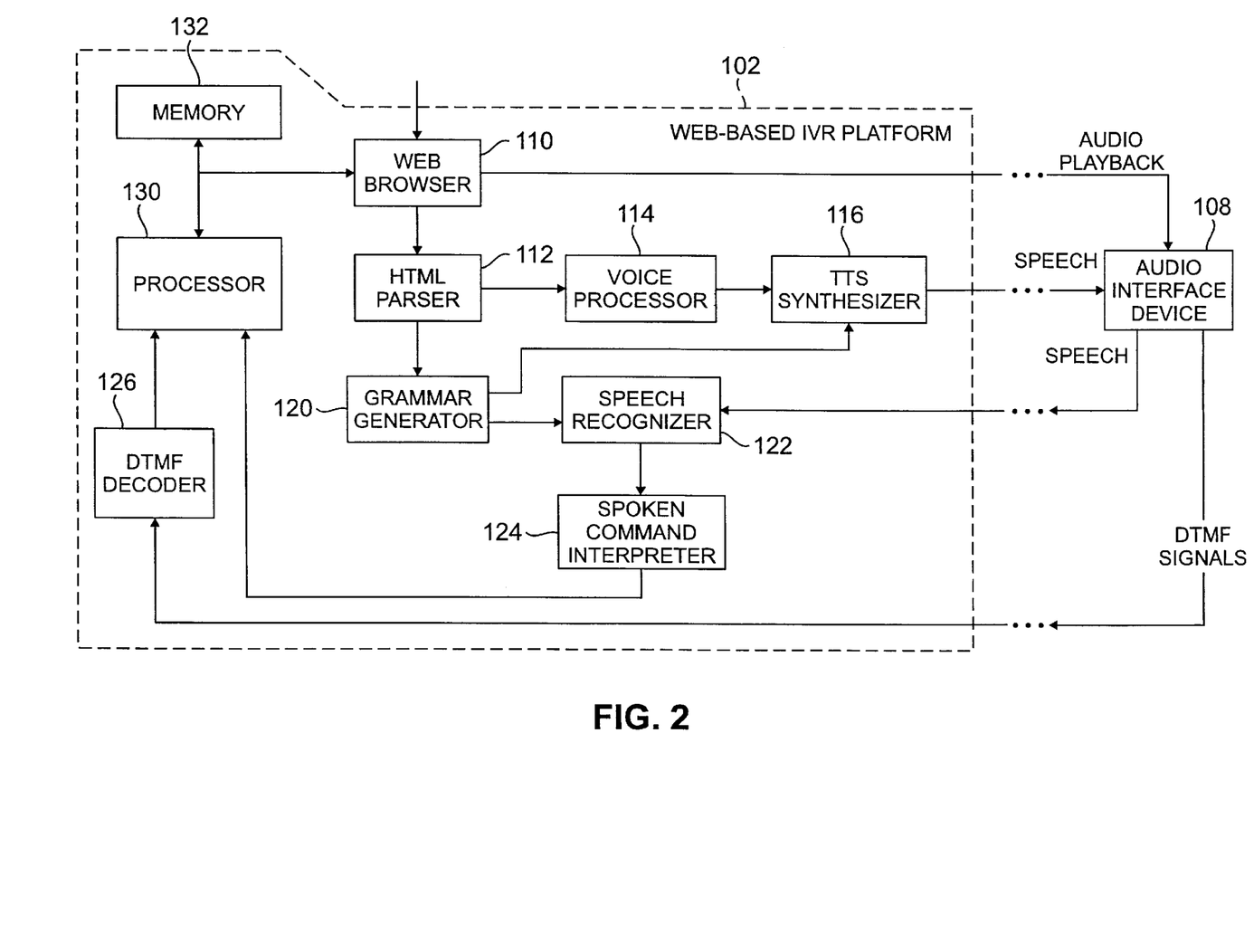
FIG. 2 shows a more detailed view of the web-based IVR platform of FIG. 1.

FIG. 2 shows the IVR platform 102 in greater detail. The IVR platform 102 includes a web browser 110 which is operative to retrieve web pages or other information from one or more of the servers 106-$i$ via network 104. The web browser 110 may be a conventional commercially-available web browser, or a special-purpose browser designed for use with audio interface device 108. For example, the web browser 110 may support only a subset of the typical web browser functions since in the illustrative embodiment it does not need to display any visual information, i.e., it does not need to process any image or video data. The browser 110 retrieves text, audio and other information from one or more of the servers 106 via the network 104. The browser 110 may be configured to play back the retrieved audio in a conventional manner, such that the playback audio is supplied to the audio interface device 108 via the network 109. The browser 110 delivers the retrieved text and other information to an HTML parser 112. The parser 112 performs preprocessing operations which configure the retrieved text so as to facilitate subsequent interpretation by a voice processor 114 and a grammar generator 120. The retrieved text is assumed in the illustrative embodiment to be in an Hyper Text Markup Language (HTML) format, but could be in other suitable format(s) in other embodiments. For example, the IVR platform 102 may also be configured to process web page information in a Phone Markup Language (PML) format. PML is a language specifically designed to build telephone-based control into HTML pages, and including PML capability in the IVR platform allows it to better support a wide variety of web-based IVR applications.

The voice processor 114 performs analysis of the text and other web page information supplied by the HTML parser 112, and generates corresponding verbal descriptions which are supplied to a text-to-speech (TTS) synthesizer 116. The HTML parser 112, voice processor 114 and TTS synthesizer 116 transform the text and other web page information into speech which is delivered to the audio interface device 108 via the network 109. The grammar generator 120 utilizes the text and other web page information received from the HTML parser 112 to produce one or more speech recognition grammars which are delivered to a speech recognizer 122. The speech recognizer 122 receives speech input generated by the audio interface device 108, and utilizes the grammar produced by grammar generator 120 to recognize words in the speech. Appropriate indicators of the recognized words are then supplied to the spoken command interpreter 124, which interprets the indicators to generate corresponding command signals. The command signals are supplied to a processor 130 which controls the operation of at least a portion of the IVR platform 102. The IVR platform 102 further includes a dual-tone multiple frequency (DTMF) decoder 126 which decodes DTMF signals received in platform 102 from the audio interface device 108 via the network 109. Such signals may be generated, for example, in response to selections offered in the audio playback or speech supplied from IVR platform 102 to the audio interface device 108. The decoded DTMF information is supplied from the decoder 126 to the processor 130.

The processor 130 interacts with a memory 132, and with the web browser 110. The processor 130 may be a microprocessor, central processing unit, application-specific integrated circuit (ASIC) or any other digital data processor which directs the operation of at least a portion of the IVR platform 102. For example, the processor 130 may be a processor in a computer which implements the web browser 110 or one or more of the other elements of the IVR platform 102. The memory 132 may represent an electronic memory, a magnetic memory, an optical memory or any other memory associated with the IVR platform 102, as well as portions or combinations of these and other memories. For example, memory 132 may be an electronic memory of a computer which, as noted above, may also include processor 130. In other embodiments, the IVR platform 102 may be implemented using several interconnected computers as well as other arrangements of suitable processing devices.

The TTS synthesizer 116, speech recognizer 122, spoken command interpreter 124, DTMF decoder 126, processor 130 and memory 132, as well as other elements of IVR platform 102, may be elements of conventional systems that are part of or include a base platform such as the Intuity/Conversant system or Lucent Speech Processing System (LSPS), both from Lucent Technologies Inc. of Murray Hill, N.J. As previously noted, the IVR platform 102 may be implemented using one or more personal computers equipped with commercially available speech and telephony system boards. It should be noted that the dotted line connections between platform 102 and audio information device 108 in FIG. 2 may represent, e.g., a single connection established through the network 109, such as a telephone line connection established through a PSTN or a cellular or other type of wireless network.

The IVR platform 102 in an illustrative embodiment may be configured to respond to either voice commands or DTMF signals in one of the following three modes: (1) DTMF only, in which descriptions include phrases to associate, e.g., button numbers on audio interface 108 with information available via a retrieved web page; (2) voice only, where a concise description of a retrieved web page is given in the form of speech generated by TTS synthesizer 116; and (3) both DTMF and voice, where both speech description and phrases identifying button numbers and the like may be given. The DTMF only mode may be desirable when operating audio interface 108 in a noisy environment, such as a busy city street or in a crowd of people, because background noise might be interpreted as voice commands by IVR platform 102. The voice only mode is often most desirable, because it tends to produce the most rapid page descriptions.

The voice processor 114 in IVR platform 102 takes the output from the HTML parser 112 and further analyzes the corresponding retrieved HTML web page to identify structure such as, for example, section headings, tables, frames, and forms. The voice processor 114 in conjunction with TTS synthesizer 116 then generates a corresponding verbal description of the page. In general, such a verbal description may include speech output corresponding to the page text, along with descriptions of sizes, locations and possibly other information about images and other items on the page.

Depending on the preference of the user, the page can be described by content or by structure. For example, a user may be permitted to choose either a description mode or an inspection mode. In an example of the description mode, the IVR platform 102 will immediately start to describe a new web page upon retrieval using the various TTS voices to indicate various special elements of the page. The user can command IVR platform 102 to pause, backup, skip ahead, etc., in a manner similar to controlling an audio tape player, except that content elements such as sentences and paragraphs can be skipped.

In an example of the inspection mode, IVR platform 102 will briefly describe the structure of the page and wait for spoken inspection commands. Inspection commands allow the user to "descend" into elements of the page to obtain greater detail than might normally be obtained in the description mode. For example, each element of a table can be inspected individually. If a given table element also has structure, the user can descend into this structure recursively. The inspection mode uses appropriate dialog to provide the user with flexibility in controlling the way information is delivered. The user may be given control over the TTS speaking rate, and the ability to assign various TTS voices to certain HTML element types such as section heading, hyperlink titles, etc. In addition, section headings may be rendered in a different voice from ordinary text. If section headings are detected, initially only the headings will be described to the user. Voice commands can then be used to instruct IVR platform 102 to move to a particular section, i.e., the user can speak the heading title to instruct IVR platform 102 to move to that section.

The above-noted tables may be used for page layout only or may be true tabulations. The page analysis process implemented in HTML parser 112 and voice processor 114 determines which is most likely and generates descriptions accordingly. True tabulations are described as tables. Tables used for page layout purposes are generally not described explicitly, but table element locations may be described if deemed important. An inspection mode can be used to override this table treatment when, e.g., IVR platform 102 hides table descriptions. Frames can also be handled in a number of ways, including a full page description method and a frame focus method. The full page description method merges the information from all frames into a single context that allows the user to verbally address all elements independently of the frames. The frame focus method allows the user to specify a frame to be described or inspected, such that voice commands are focused on that frame. Forms may be described, for example, in terms of field title labels, with the fields addressable by speaking field titles. In addition, general items can be entered into form fields by spelling, and the above-described inspection mode can be used to obtain menu choices.

The grammar generator 120 in IVR platform 102 automatically generates speech recognition grammar and vocabulary from the HTML of a retrieved web page. This is an important feature of IVR platform 102 that makes it useful for building IVR applications. The parsed HTML is analyzed in grammar generator 120 for section titles, hyperlinks and other indicators that are to converted to speech. Grammar generator 120 then constructs a subgrammar for each indicator by generating all possibly ways of speaking subsets of the indicator. All other voice commands are then combined with the subgrammar and a complete grammar is compiled into an optimized finite-state network. This network is loaded into the speech recognizer 122 to constrain the possible sequences of words that can be recognized. Other types of grammar generation could also be used in conjunction with the invention.

A byproduct of the illustrative grammar generation process implemented in grammar generator 120 is the creation of a list of vocabulary words. This list may be partially processed by the TTS synthesizer 116 to create a list of phonetic transcriptions in symbolic form. The same phonemes may be used in both the speech recognizer 122 and the TTS synthesizer 116. The symbolic phonetic descriptions, once loaded into the recognizer 122, tell the recognizer how the vocabulary words are pronounced, thus making it possible for the IVR platform 102 to recognize virtually any spoken word.

In normal operation, the IVR platform 102 describes retrieved web pages to the user via the speech output of the TTS synthesizer 116. The user controls the IVR platform 102 by speaking over the TTS synthesizer output, thus "barging in." Echo cancellation may be used to remove TTS synthesizer output from the speech recognition input so that speech recognition will be unaffected by the TTS output. When the user speaks for a sufficiently long period, the TTS output may be interrupted, such that speech recognition can be more effectively performed, and the speech recognizer output is interpreted into an IVR platform command.

As part of the grammar generation process, voice command interpretation tables may be established for use later in the interpretation phase. For example, a stored table of possible command phrases may be used to associate computer instructions with each phrase. Typically, no ambiguous browser command phrases are defined. In the case of processing a hyperlink, the Uniform Resource Locator (URL) of the hyperlink is associated with all possible subsets of the hyperlink title. Section titles can be handled in a similar manner similar. Subsequently, when a title word is spoken, the associated URL(s) can be retrieved.

It is possible that more than one URL and/or browser command will be retrieved when the spoken title words are not unique. In such a case, a simple dialog may be initiated such that the user is given a choice of full title descriptions that can be selected either by spoken number or by speaking an unambiguous title phrase. If the phrase is still ambiguous, a new and possibly smaller list of choices may be given. The user can back up at any time if the selection process has not yielded the desired choices. This allows the user to refine the list and converge on one choice.

2. Processing Details

Various aspects of the voice processing and other operations performed in the IVR platform 102 of FIG. 2 will be described in greater detail below.

2.1 HTML Parsing

As noted above, the HTML parser 112 parses HTML in retrieved web pages for the purposes of facilitating production of speech output and generation of grammar. The HTML parsing process is purposely kept relatively simple. Full context-free parsing is not required and may even be undesirable because, while HTML is typically well structured, many real-world HTML pages include software bugs and other errors. Therefore, relying on the HTML standard and enforcing a strict context-free parsing will often be counterproductive.

Proper generation of speech output requires an explicit representation of the structure of a given web page. The HTML parsing process is used to obtain a representation of this structure. Important elements such as frames, tables and forms are identified and their scope within their containing elements is analyzed. For example, a form can be contained in a table, which it turn can be contained in a frame, etc. A critical part of this analysis is to determine the structural significance of these elements as opposed to their graphical significance. For example, several levels of tables may be used in a web page for the sole purpose of alignment and/or generating attractive graphics around various elements. In such a case, the entire set of tables may be structurally equivalent to a simple list. Proper voice rendering in this case requires that the tables be ignored and only the bottom-level elements be spoken, i.e., described to the user as a list. In the case of a "real" data table, the table would instead be described as such.

The parsing process itself presents two significant problems which are addressed below. The first is that various relationships must be derived from the HTML and explicitly represented, whereas a normal browser replaces the explicit representation with a rendered page image. Thus, the representation must explicitly know, e.g., which words are bold, italic and part of a link title, as opposed, e.g., to those that are italic and part of an H3 title. Any particular combination could have significance in showing relevant structure. This problem is addressed in the HTML parser 112 by "rendering" the page into data structures. Each string of text with uniform attributes has an attribute descriptor that specifies all the features, e.g., such as bold, link text, heading level, etc., currently active in that string. This does not itself provide a hierarchical structure. However, such a structure, although generally not necessary at the HTML source level, can be generated by examining the tag organization.

The second parsing problem is that HTML pages often include errors. This means that a document that appears well-structured on the screen may be poorly structured at the source level. The HTML parser 112 must analyze the improperly structured source and determine a well-formed structure that is equivalent to what the user would see on the screen. This can be tricky in some common cases, such as a missing <TD> within a table, which can cause a conventional browser to discard the element. This is particularly troublesome for cases involving form elements. This problem should become less significant as automated tools become more widely used. However, such tools are also likely to lead to a proliferation of excess HTML, e.g., multi-level tables used for layout.

As previously noted, the grammar generation process requires extracting the hyperlink titles, and saving the URLs from the page. Any so-called alternative or "ALT" fields, intended for use with browsers which have no image capabilities, may also be extracted as part of this process. In addition, certain other text such as section headings can be included in the speech grammars. The parsing operations required to do this extraction can be implemented using conventional regular expression parsing.

2.2 Verbal Rendering

The web page description generated in the IVR platform 102 is referred to herein as a verbal rendering of the web page. In an illustrative embodiment, the user can be permitted to decide whether to have automatic presentation of the title of the page. If the user has selected automatic presentation of the page title, the title will be stated to the user. The verbal rendering will then continue with either a description of the page content or a description of the page structure, again depending, e.g., on previously-established user preferences. Typically, the simpler of these two approaches is the structural page description.

As previously noted, two modes of page description operation may be provided: a description mode and an inspection mode. In the description mode, the IVR platform will continue to render the page until instructed otherwise or the description is complete. The inspection mode gives the user the initiative such that the user can ask questions and get specific answers. Utilizing the inspection mode allows the user to descend recursively into structural elements of the page. The user can switch between the description and inspection modes under voice control.

2.2.1 Structure Description

The page structure is generally described in terms of the placement of elements like images, tables and forms. In the inspection mode, the user will typically get a top-down description with options to open various elements. Consider as an example a simple web page made of three forms: a title/information frame across the top, an index bar down the side, and a main page. A top-level description of this page might be "a title frame, index frame and a page." In this case, the user would specify a focus to one of the three areas for further description. During navigation, links in the title and/or index frames would be available at all times or only on request, based on user preference. Certain other common features, such as a single-entry search form, may also be described as a top-level layout item even if not in a separate frame. If the page contains a search form, the page could be described as "a title frame, index frame and a page with a search form."

Description of the main page may be based on apparent structure. For example, if there are four section entries, i.e., <H1> entries, on the page, then the description would be "a page with five sections." The section headers, i.e., <H1> contents, plus "top of page" would be available for speaking to jump to that section. If the user says nothing, then the system either waits or starts with the first section, based on user preference. Note that other entities can be the basis for section breakdown. For example, a page with several lists, each proceeded by a short paragraph of plain text, could be broken down into one section per list, with the apparent heading paragraph being spoken to the user.

Description of a section may also be done based on apparent structure. If the section is plain text, then the number of paragraphs is announced and speaking begins, with navigation between paragraphs supported. Subsection breakdown can be performed in a similar manner, based on the presence of lower-level headers or bold lines that appear to be used as section headers. This subsection analysis will probably not go past this second level as the user may be unable to keep track of position with more levels. All other information could be read sequentially.

If the page includes a table, a determination is made as to its purpose. Examples of different purposes include graphics, alignment, or data. Graphics indicates that the table is only there to get a particular background or border, and such tables are ignored. The difference between alignment and data is that in an alignment table the contents are inherently one-dimensional whereas in a data table the contents are arranged in a two-dimensional array. The contents of an alignment table are either treated as a list or ignored, based on whether significant alignment would be apparent to a viewer. A data table is described as such, with the number of rows and columns announced, and an attempt made to locate the row and column headers. Navigation based on the two-dimensional structure is available.

Form description depends on the relative size of the form within a page. One single-entry form may be handled in the manner described above. A larger form that appears to be only part of a page may be announced as such but is generally accessed as its elements appear in the reading. Direct navigation is possible based on form number and element number. Finally, a page that is mostly a form is treated as a form rather than a page. An attempt is made to locate the name of each entry to aid in description and direct navigation. Also note that a section, subsection or other localized form within a page may be treated in a similar manner. This introduces modal processing where once the form is "entered," then navigation is form-based rather than paragraph or section based, until the form is "exited," i.e., submitted or skipped.

2.2.2 Content Description

Page content is described to the extent possible by using IVR platform 102 to synthesize text on the page and describe the known content of images, tables, forms and other structure. More specifically, designated types of speech may be generated for each of the various HTML elements, e.g., for hyperlink titles, bold text, form field labels, and other elements useful in navigation. The designated types of speech can be user-defined.

2.3 Web Page Analysis

In accordance with the invention, web page analysis carried out in the IVR platform 102 attempts to fit a given web page to one of several predefined page models, with a default top-down strategy used for pages that do not fit. The objective is to maximize user comprehension of pages by designing models that have an easy-to-remember structure, i.e., we want to prevent a user from getting lost and make it easy to locate relevant parts of a page. For this reason the models may be made inherently simple and mostly sequential with minimum hierarchy. Analysis consists of the two steps of identifying the best model and then fitting the page content to the model parts. Navigation options may then be partly controlled by the model. This should simplify use for experienced users because the model can be announced, thereby signaling the optimum navigation strategy.

In the illustrative embodiment, three levels of models are used: frame, page and section. This is because pages can change within otherwise constant frames. We want to model the frame layout separately because it can remain constant, so use of the frame model can simplify navigation. In general, most section models may be implemented as page models applied to a single section. The following is an exemplary set of frame models:

1. Single frame or no frames. In this case, no mention of frames is made, simply that there is "a page."
2. Main page and auxiliary. There is a single main frame for the page and surrounding frames for constant material, such as a header, index bar or search form. The example given above fits this model.
3. Split-screen. This means that the multiple frames are all logically part of the same page, which simply permits different areas to be visible at the same time while others are scrolled. The difference is that some of the frames are intended to remain constant while others switch page contents. Note that identifying this model can be difficult without an embedded hint.
4. Multi-page. This is a catch-all model for all multi-frame layouts that do not fit any other model. In this case, it is not clear whether the frames remain related or which are more constant than others. An example would be two frames that each take half of the total screen, without any embedded hint that one of the other models fits.

Each page within a frame set is then matched against a set of page models, although the specified frame model can imply that certain frames contain certain types of pages. The following is an exemplary set of page models:

1. Title area. This model applies only to a page in a title-area frame. No navigation except top to bottom reading applies. Links and limited forms are permissible.
2. Index area. This model applies to a frame of index links. It is treated a list, or a set of lists if headers are apparent. Navigation is top to bottom or to a header. A simple form is permissible, which can be directly navigated to by the user.
3. Form. This model indicates that the entire page consists mostly of a form. All navigation is customized for forms. This can be a main or auxiliary page, and also applies to sections.
4. Plain page. The page has no detectable structure beyond paragraphs, if even that. Reading is top to bottom with paragraph navigation. This also applies to sections.
5. List. The page consists mostly of a list. Also permissible is header and trailer material. Note that the list can be made of structures besides an <OL> or <UL>, such as tables. This also applies to sections or isolated lists.
6. Table. The page consists mostly of a true table, plus optional header and trailer material. The table structure is described in terms of rows, columns and headers, and navigation based on this structure is available, e.g., "read row two." This also applies to sections or isolated tables.
7. Image. This means that the page is mostly an image, possibly with a caption or title. This implies that it is apparently not really just a list in bitmap form. This also applies to sections or isolated images.
8. Slide table. This is a list of images, possibly two-dimensional, optionally with captions. A two dimensional list with apparent row and column headers is a table whose contents are images, whereas without these headers it is a slide table. Note that an apparent slide table may really be a command list where bitmaps are used instead of text, although this is a difficult distinction to make.
9. Sectioned page. This model indicates that the page is broken into a number of top-level sections by a set of <H1> or other entries. Navigation to individual sections is supported, and the section header list can be requested. This is also carried out to one additional subsection level. Subsections are only available within the current section.
10. Multi-sectioned page. This is a special case of the sectioned page where there are more than two levels but there is a strict hierarchical numbering scheme, such as "Section 1.A.4." These section numbers are used for navigation and are globally available. The headers are also available within the active section tree. The difference with the sectioned page is that without the strict numbering, sectioning is not done past two levels due to the probability of confusion.

It should be emphasized that the frame, page and section models described above are examples only, and a subset of these models, as well as combinations of these and other models, may be used in a given embodiment of the invention.

2.3.1 Images and Text

In the illustrative embodiment, paragraphs are generally read top to bottom, with repeat and skip commands being available for navigation. Paragraphs in a section can be optionally numbered for quick navigation. Almost any non-text item will start a new paragraph. The main embedded items are links, font changes and images. Images are considered embedded if the text flows around them, but are considered separate paragraphs if they stand alone on a given "line" of the page. Embedded links may be read in a different voice. Font changes are normally ignored, but user preferences can be set to assign different voices to them. A paragraph with embedded images may be announced as such before any of its textual content is read. Images can be described, e.g., by caption, and the request of a particular image may be done by number, with numbering done in row-major order. Typically, no mention of these images is made while reading the text. Isolated images, e.g., image-only paragraphs or table elements, may be described, e.g., as "an image captioned . . ." and possibly with the size announced.

2.3.2 Tables

In accordance with the invention, tables are analyzed to classify their purpose. Tables with a single element are generally ignored and their element used without regard to the table. Tables with row and/or column headers are generally classified as data tables and described and navigated as such. All other tables are examined for a fit to various models. An exemplary set of table models may be as follows: A table with two elements, one of which is an image, is taken to be an image and title combination. This becomes an "image" and the table itself is ignored. A table whose elements are mostly form elements is taken to be a form. The table structure is used to associate titles with elements and to establish next/previous relationships but is otherwise not mentioned to the user. A table whose elements are plain text or links is taken as a list.

2.3.3 Forms

In the illustrative embodiment, forms may be classified as either "embedded" or "plain." An embedded form with a single element or other type of small form may be viewed as an entry area, e.g., a search entry. These types of forms can be treated as top-level items, e.g., search, or as plain paragraphs, e.g., a "give us your comments" element at the end of a page. All other forms are treated as plain forms. The main point of the form analysis is to enable description and form-specific navigation. We generally want to classify all elements in a form as to whether they are "global descriptive" or are a title, instructions, etc. associated with a particular element. We also want to establish previous/next relationships. Note that material immediately before or after a form can be considered part of the form, e.g., as a title or notes. The analysis in the illustrative embodiment generally assumes that the form is syntactically inside or close to the <FORM> and </FORM> pair, even though form elements can be located throughout plain page. The analysis attempts to make use of adjacency in the HTML source, or in corresponding tables. Note that a table with headers that contain "significant and regular" form entries may be considered a form with table navigation added, whereas a table with only a few entries might instead be described as a table with incidental form elements.

2.4 Automatic Grammar Creation

As noted above, the grammar generator 120 in IVR platform 102 generates speech grammars from hyperlink titles and other web page information. This grammar generation may involve, for example, creating a Grammar Specification Language (GSL) description of each possible subset of the title words. The resulting GSL is compiled and optimized for the speech recognizer 122. In addition, the vocabulary words used in the grammar are phonetically transcribed using the TTS synthesizer 116. Additional details regarding GSL can be found in, for example, M. K. Brown and J. G. Wilpon, "A Grammar Compiler for Connected Speech Recognition," IEEE Transactions on Signal Processing, Vol. 39, No. 1, pp. Jan. 17–28, 1991, which is incorporated by reference herein.

2.4.1 Combinatorics

Flexibility may be added to the voice navigation commands through the use of combinatoric processing, e.g., computing all $2^{n-1}$ possible combinations of the title words, while keeping the words in order. This process provides a tightly constrained grammar with low perplexity that allows all possible word deletions to be spoken, thereby giving the user freedom to speak only the smallest set of words necessary, e.g., to address a given hyperlink. The process can also create many redundancies in the resulting GSL description, because leading and trailing words are reused in many subsets. The redundancy may be removed when the grammars are determinized, as will be described below. Small word insertions may be allowed by inserting so-called acoustic "garbage" models between words in the hyperlink title subsets. This can be done automatically by the grammar generator 120. The combinatoric processing may be inhibited when <GRAMMAR> definitions are encountered. A mixture of hyperlink titles and <GRAMMAR> definitions can be used on a single page to take advantage of the features of each method.

2.4.2 Grammar Compilation

In the illustrative embodiment, grammar compilation generally involves the steps of preprocessing the created GSL to include external files, expanding macros, parsing the expanded GSL and generating grammar network code. The grammar code describes grammar rules that define how states of a finite-state network are connected and what labels are attached to the state transitions. For additional details, see M. K. Brown and B. M. Buntschuh, "A Context-Free Grammar Compiler for Speech Understanding Systems," ICSLP '94, Vol. 1, pp. 21–24, Yokohama, Japan, Sep. 1994, which is incorporated by reference herein. The resulting finite-state network is typically large and redundant, especially if most of the GSL is created from hyperlink titles, making the grammar inefficient for speech recognition. In accordance with the invention, this inefficiency may be reduced in four stages of code optimization.

The first stage involves determinizing the grammar using the well-known finite-state network determinization algorithm. This eliminates all LHS redundancy in the grammar rules making the resulting network deterministic in the sense that, given an input symbol, the next state is uniquely defined. All grammar ambiguity is removed in this stage. The second stage of optimization minimizes the number of states in the network using the O(n log (n)) group partitioning algorithm. This eliminates all homomorphic redundancy while preserving determinism. This is the state-minimal description of the grammar, but is not necessarily the most efficient representation for speech recognition. The third stage of optimization removes all RHS grammar rule redundancy. This operation does not preserve determinism, but does eliminate redundant state transitions. Since state transitions carry the word labels that represent word models and therefore cause computation, reducing redundancy in these transitions is beneficial even though the number of states is usually increased in the process. The last stage of optimization is the removal of most null, i.e., "epsilon," state transitions. Some of these null transitions are created in the third stage of optimization. Others can be explicitly created by a <GRAMMAR> definition. While null transitions do not cost computation, they waste storage and therefore should be eliminated.

It should be noted that in alternative embodiments of the invention, grammars may be partially or completely precompiled rather than compiled as the grammars are used. Such an arrangement may be beneficial for applications in which, for example, the grammars are very large, such as name dialing directories, or would otherwise require a long time for compilation.

2.4.3 Phonetic Transcription

The above-noted vocabulary words are extracted from the grammar definitions during the compilation process. For example, each word may be processed in isolation by a pronunciation module in the TTS synthesizer 116 to create phonetic transcriptions that describe how each word is pronounced. This method has the disadvantage of ignoring context and possibly mispronouncing a word as a noun instead of a verb or vice versa, e.g., object, subject, etc. Context information may be included in order to provide more accurate pronunciation.

2.5 Voice Interpretation

In the illustrative embodiment, voice commands may be interpreted rapidly by using hash tables keyed on the spoken phrases. This is typically a "many-to-many" mapping from speech recognizer output text to computer commands or URLs. If more than one URL and/or command are retrieved from the table a disambiguation dialog manager may be utilized to direct the user to make a unique selection. Separate hash tables can be maintained for each web page visited so that grammar recompilation is not necessary when revisiting a page. This can lead to the creation of many hash tables, but the table size is typically small, thus making this an effective method for web page browsing. For large grammar applications, it may be possible to automatically create a semantic parser using the grammar compiler. Interpretation then can be done in two stages, e.g., if a hash table created from hyperlink titles is found, in a first stage, not to contain the key phrase, then the semantic parser can be used, in a second stage, to interpret the phrase.

3. General Web-Based IVR Applications

The IVR platform 102 in accordance with the invention not only provides a speech-controlled web browser, but can also be used to allow the general Internet population to build IVR applications. The advantage of this approach is the elimination of the need for the individual or small business user to own any special IVR equipment. As previously noted, typical IVR platforms are very expensive, and therefore only moderately large businesses or ISPs can generally afford to own this equipment. However, since a user can program applications which utilize the IVR platform 102 by simply writing HTML, PML or other types of web pages, while obtaining the IVR platform service from an ISP which owns that platform, the small business or individual user does not need to make any large investment in equipment.

As noted previously, each ordinary hyperlink title in a given page or set of pages may be processed to produce subgrammars that allow all spoken subsequences for the words in the title. For general IVR applications, the content developer can write more complex grammars by, e.g., inserting a <GRAMMAR> tag, followed by a grammar written in GSL, followed by a <GRAMMAR> tag. Using this method, many entirely different phrases can be used to address the same URL. The use of GSL in these applications is similar to its normal use for defining speech grammars in other applications. For example, the local <GRAMMAR> scope may comprise the entire definition for the current URL. Included files can contain surrounding grammar definitions. Macros can be defined either within the local <GRAMMAR> scope or can reside in included files. All macros typically have global scope within the web page.

Local applet code and other types of application code in a web page may be used to give the IVR content developer the means to perform operations on either a server or a client. In a typical IVR platform application, Java code might be used to perform operations at the server that could, in turn, control remote devices through the Internet or the PSTN using additional hardware at the remote end. Since HTML pages on the Internet form an implicit finite-state network, this network can be used to create a dialog system. The resulting system uses dialog to control the output of web page information to the user. Even without an applet language, such a dialog system can be built using the techniques of the invention.

More specifically, an IVR web page implemented in such a dialog system may include, e.g., possibly null text to be spoken to the user when the page is read, a program script that would execute operations on the host processor, and a possibly silent hyperlink for each appropriate spoken response from the user. In addition, there may be other hyperlinks that are taken when the speech recognizer rejects an utterance as unrecognizable. Using these basic building blocks, a dialog system can be constructed.

As a simple example, a representation of the <GRAMMAR> tag embedded in a hyperlink (e.g., HREF ="http://www.anywhere.net/" GRAMMAR="((get|retrieve|call for) messages)" TITLE="Get messages") can represent a flexible set of alternative utterances that a user can say to cause an action such as initiating a phone call to the user's answering machine. In this case the hyperlink is not silent since the title part of the hyperlink is spoken to the user: "Get messages." If the title part of the hyperlink is empty, then nothing is spoken to the user. The user can respond with "get messages," "retrieve messages," or "call for messages" in this simple example. By speaking a command and following this link to the next web page, the user may then be read text on that page, e.g., "Do you want voice or email messages?" Two hyperlinks on that page with appropriate speech grammars would then link to appropriate pages to cause access to voice messages or email. A third default link might be taken when the utterance is not understood since the speech recognizer can be configured to return a token to indicate non-recognition. For each of the message choices there may be a further set of web pages to deal with functions such as reading, saving, deleting messages and responding to messages. Another example of a representation of a <GRAMMAR> tag embedded in a hyperlink is HREF="http://www.anywhere.net/" GRAMMAR_FILE=<URL>. In this case, the specified URL indicates where the grammar file can be found. Many other types of dialog systems can be constructed in a similar manner using the techniques of the invention.

The ability to build dialog systems in this manner opens up a new class of Internet applications to the general Internet population, without requiring content developers to own or directly operate an IVR platform as long as they have services of an IVR platform available from a service provider such as an ISP. As previously noted, this is a drastic departure from conventional approaches to providing IVR service, which typically require the ownership of expensive IVR equipment. An ISP with an IVR platform system will be able to sell IVR support services to the general public at relatively low cost. Corporations with more demanding response requirements may ultimately want to operate their own platforms for a limited community of employees, but can develop and test their IVR web pages before committing to purchase costly equipment.

The above-described embodiments of the invention are intended to be illustrative only. Alternative embodiments may incorporate additional features such as, for example, Optical Character Recognition (OCR) for generating audible information from retrieved web pages, analysis of images for verbal rendering, e-mail to speech conversion, and speaker verification for secure access. These and numerous other alternative embodiments within the scope of the following claims will be apparent to those skilled in the art.

What is claimed is:

1. An apparatus for implementing an interactive voice response application over a network, the apparatus comprising:
    a speech synthesizer operative to generate speech output characterizing at least a portion of a web page retrieved over the network;
    a grammar generator operative to process information in the retrieved web page to produce at least a portion of at least one grammar; and
    a speech recognizer having an input coupled to an output of the grammar generator, wherein the speech recognizer is operative to utilize the at least one grammar produced by the grammar generator to recognize speech input;
    wherein the at least one grammar produced by the grammar generator is utilized by the speech synthesizer to create phoneme information, such that similar phonemes are used in both the speech recognizer and the speech synthesizer.

2. The apparatus of claim 1 wherein the apparatus further includes a processor operative to implement a function of at least one of the speech synthesizer, the grammar generator and the speech recognizer.

3. The apparatus of claim 1 further including a parser which identifies textual information in the retrieved web page, and delivers the textual information to the grammar generator.

4. The apparatus of claim 1 further including a voice processor which is operative to determine which of a set of predetermined models best characterizes the retrieved web page.

5. The apparatus of claim 4 wherein the voice processor utilizes a default top-down description process if the retrieved web page is not adequately characterized by any of the predetermined models.

6. The apparatus of claim 4 wherein the models characterize structure in the web page including at least one of a section heading, a table, a frame, and a form.

7. The apparatus of claim 4 wherein the voice processor applies a plurality of different sets of models to the retrieved web page, each of the sets including at least one model.

8. The apparatus of claim 1 wherein the speech synthesizer, the grammar generator and the speech recognizer are elements of an interactive voice response system associated with a service provider.

9. The apparatus of claim 1 wherein the speech synthesizer operates in a description mode, in which, unless interrupted by user input, the synthesizer provides a complete description of the retrieved web page to a user via the audio interface device, and an inspection mode, in which the synthesizer provides an abbreviated description of the retrieved web page and then awaits inspection command input from the user.

10. The apparatus of claim 1 wherein the speech synthesizer, grammar generator and speech recognizer are used to implement a dialog system in which a dialog is conducted with a user via the audio interface device in order to control the output of the web page information to the user.

11. The apparatus of claim 10 wherein the web page includes at least one of (i) text to be read to the user by the speech synthesizer, (ii) a program script for executing operations on a host processor, and (iii) a hyperlink for each of a set of designated spoken responses which may be received from the user.

12. The apparatus of claim 10 wherein the web page includes at least one hyperlink that is to be utilized when the speech recognizer rejects a given spoken user input as unrecognizable.

13. The apparatus of claim 10 wherein at least a portion of the grammar produced by the grammar generator is precompiled.

14. A method for implementing an interactive voice response application over a network, the method comprising the steps of:
    generating speech output characterizing at least a portion of a web page retrieved over the network;
    processing information in the web page to produce at least a portion of at least one grammar;
    utilizing the grammar to recognize speech input; and
    utilizing the grammar to create phoneme information, such that similar phonemes are used in both the recognizing and generating steps.

15. The method of claim 14 further including the step of determining which of a set of predetermined models best characterizes the retrieved web page.

16. The method of claim 15 further including the step of utilizing a default top-down description process if the retrieved web page is not adequately characterized by any of the predetermined models.

17. The method of claim 15 further including the step of applying a plurality of different sets of models to the retrieved web page, each of the sets including at least one model.

18. The method of claim 14 wherein the generating, processing and utilizing steps include implementing a dialog system in which a dialog is conducted with a user in order to control the output of the web page information to the user.

19. The method of claim 18 wherein the web page includes at least one of (i) text to be read to the user, (ii) a program script for executing operations on a host processor, and (iii) a hyperlink for each of a set of designated spoken responses which may be received from the user.

20. The method of claim 18 wherein the web page includes at least one hyperlink that is to be utilized when a given spoken user input is rejected as unrecognizable.

21. The method of claim 14 wherein at least a portion of the grammar produced in the utilizing step is precompiled.

22. A machine-readable medium for storing one or more programs for implementing an interactive voice response application over a network, wherein the one or more programs when executed by a machine carry out the steps of:
    generating speech output characterizing at least a portion of a web page retrieved over the network;
    processing information in the web page to produce at least a portion of at least one grammar;
    utilizing the grammar to recognize speech input; and
    utilizing the grammar to create phoneme information, such that similar phonemes are used in both the recognizing and generating steps.

23. An interactive voice response system for communicating information between a network and an audio interface device, the system comprising:
    at least one computer for implementing at least a portion of an interactive voice response platform, the platform including:
        (i) a speech synthesizer operative to generate speech output characterizing at least a portion of a web page retrieved over the network;

(ii) a grammar generator operative to process information in the retrieved web page to produce at least a portion of at least one grammar; and (iii) a speech recognizer operative to utilize the at least one grammar produced by the grammar generator to recognize speech input;

wherein the at least one grammar produced by the grammar generator is utilized by the speech synthesizer to create phoneme information, such that similar phonemes are used in both the speech recognizer and the speech synthesizer.

24. The system of claim 23 wherein the interactive voice response platform is associated with a service provider.

25. The system of claim 23 wherein the interactive voice response platform implements a dialog system in which a dialog is conducted with a user in order to control the output of the web page information to the user.

26. An apparatus for implementing an interactive voice response application over a network, the apparatus comprising:

a speech synthesizer operative to generate speech output characterizing at least a portion of a web page retrieved over the network;

a grammar generator operative to process information in the retrieved web page to produce at least a portion of at least one grammar; and a speech recognizer having an input coupled to an output of the grammar generator, wherein the speech recognizer is operative to utilize the at least one grammar produced by the grammar generator to recognize speech input;

wherein the speech synthesizer operates in a description mode, in which, unless interrupted by user input, the synthesizer provides a complete description of the retrieved web page deliverable to a user via an audio interface device, and an inspection mode, in which the synthesizer provides an abbreviated description of the retrieved web page and then awaits inspection command input from the user.

27. A method for implementing an interactive voice response application over a network, the method comprising the steps of:

generating speech output characterizing at least a portion of a web page retrieved over the network;

processing information in the web page to produce at least a portion of at least one grammar; and utilizing the grammar to recognize speech input;

wherein a speech synthesizer used in the generating step generates one or more phonetic transcriptions, and the phonetic transcriptions are used in the utilizing step to recognize the speech input.

28. A machine-readable medium for storing one or more programs for implementing an interactive voice response application over a network, wherein the one or more programs when executed by a machine carry out the steps of:

generating speech output characterizing at least a portion of a web page retrieved over the network;

processing information in the web page to produce at least a portion of at least one grammar; and utilizing the grammar to recognize speech input;

wherein a speech synthesizer used in the generating step generates one or more phonetic transcriptions, and the phonetic transcriptions are used in the utilizing step to recognize the speech input.

29. An interactive voice response system for communicating information between a network and an audio interface device, the system comprising:

at least one computer for implementing at least a portion of an interactive voice response platform, the platform including:

(i) a speech synthesizer operative to generate speech output characterizing at least a portion of a web page retrieved over the network;

(ii) a grammar generator operative to process information in the retrieved web page to produce at least a portion of at least one grammar; and (iii) a speech recognizer operative to utilize the at least one grammar produced by the grammar generator to recognize speech input;

wherein the speech synthesizer operates in a description mode, in which, unless interrupted by user input, the synthesizer provides a complete description of the retrieved web page deliverable to a user via the audio interface device, and an inspection mode, in which the synthesizer provides an abbreviated description of the retrieved web page and then awaits inspection command input from the user.

* * * * *